Patented Apr. 7, 1936

2,036,311

UNITED STATES PATENT OFFICE 2,036,311

PRODUCTION OF CHLORINE DIOXIDE

James F. White, Niagara Falls, N. Y., assignor to The Mathieson Alkali Works, Inc., New York, N. Y., a corporation of Virginia No Drawing. Application August 15, 1934, Serial No. 739,938

3 Claims. (Cl. 23—152)

This invention relates to improvements in the production of chlorine dioxide. More particularly, the invention relates to a method for selectively separating chlorine from a gas mixture including chlorine and chlorine dioxide, such as gas mixtures produced by reaction between chlorates and acids.

Reaction between chlorine and reagents of the class consisting of the oxides, hydroxides and various carbonates (including acid carbonates) of magnesium, the alkali metals and the alkaline earth metals proceeds more rapidly than reaction between chlorine dioxide and these reagents. The differentials between the reaction velocities are sufficient to enable a substantially complete separation of chlorine from the mixture without substantial loss of chlorine dioxide under appropriate conditions. In carrying out this invention, the gas mixture including chlorine and chlorine dioxide is contacted with a reagent of this class selectively to separate chlorine from the gas mixture.

Since chlorine dioxide as well as chlorine reacts, although more slowly, with these reagents, the reaction is controlled in carrying out this invention to minimize reaction between chlorine dioxide and the separating reagent. The two principal elements of control are (1) the effective period of contact between the gas mixture and the separating reagent and (2) the proportion of water present. In any particular case, the loss of chlorine dioxide, through reaction with the separating reagent, increases as the period of contact increases and as the proportion of water present increases.

In carrying out this invention, the period of contact is limited and the proportion of water present is limited, and these two elements of control are correlated, to minimize the reaction between chlorine dioxide and the separating reagent.

The separating reagent may be used in a substantially dry form, in the form of a paste, in the form of a slurry or in the form of a solution. When the separating reagent is used in substantially dry form, control of the proportion of water present includes control of the degree of hydration of the separating reagent and control of the relative humidity of the gas mixture, the optimum period of contact, particularly when the chlorine and chlorine dioxide are diluted with an inert gas is prolonged and control of the period of contact is less critical. As the proportion of water present increases, however, control of the period of contact becomes more critical until, in the case of slurries or solutions, control of the period of contact becomes, in effect, the sole control of the reaction. The use of the separating reagent in substantially dry form is embraced within this invention, in its broad aspect but, specifically, the use of the separating reagent in substantially dry form is the invention of George P. Vincent and is described in more detail in his application filed August 15, 1934, Serial Number 739,941.

Using magnesium compounds as separating reagents, particularly, control of the period of contact is very critical unless the proportion of water present is kept at a low value. In the total absence of water, magnesium oxide reacts with neither chlorine nor chlorine dioxide, but as the proportion of water present increases the differential between the velocity of the chlorine reaction and the velocity of the chlorine dioxide reaction at first increases and then begins to diminish. When using magnesium oxide or magnesium hydroxide as a separating reagent, the ratio $H_2O:MgO$ is with advantage maintained at a value approximating 1:1–1:1.5.

The gas mixture including chlorine and chlorine dioxide also includes, with advantage, an inert gaseous diluent such as air. Improved control of the period of contact is thus attained. When the separating reagent is used in the form of a slurry or solution, such dilution is used with special advantage to assist in control of the period of contact. In so carrying out the invention, the proportion of chlorine dioxide in the total gas mixture is advantageously limited to approximate 10%–12% (by weight) for example.

A substantial excess of the separating reagent is with advantage maintained present in the zone of contact. That is, an amount of the separating reagent substantially exceeding that required for reaction with the chlorine of the gas mixture subjected to contact with the reagent is with advantage maintained present in the zone of contact, particularly when the separating reagent is used in a substantially dry form. For example, the separating reagent may be used in amounts such that the chlorinated proportion of the separating reagent does not exceed about 30%–35% of the total present in the zone of contact.

The following examples of operations embodying the invention will further illustrate the invention:

*Example 1.*—A gas mixture consisting of approximately equal proportions of chlorine and chlorine dioxide diluted with air to an extent such that the partial pressure of the chlorine dioxide approximated 15-35 mm. of mercury and substantially saturated with water vapor was passed through each of a series of small glass bottles each containing a slurry consisting of 57 grams of calcium hydroxide, $Ca(OH)_2$, in 100 cc. of water, the gas mixture being introduced into each bottle through a glass inlet tube of 5 mm. internal diameter and arranged just to touch, under static conditions, the surface of the slurry in that bottle. The gas mixture was supplied to the first bottle of the series at a rate of 2,000 cc. per minute and the separation was effected at a temperature of 20°-25° C. Substantially all of the chlorine and only about 0.5% of the chlorine dioxide were absorbed in the first two bottles, the gas mixture issuing from the second bottle of the series being substantially free from chlorine and containing about 99.5% of the chlorine dioxide present in the initial gas mixture.

*Example 2.*—A gas mixture consisting of approximately equal proportions of chlorine and chlorine dioxide diluted with air to an extent such that the partial pressure of chlorine and chlorine dioxide approximated 10-30 mm. of mercury and substantially saturated with water vapor was passed successively through a series of three glass test tubes each containing 20 cc. of an aqueous 6 molar NaOH solution. The gas mixture was introduced into each test tube through a glass tube of 5 mm. internal diameter the lower edge of which was immersed 2-4 mm. beneath the surface of this solution. The gas mixture was supplied to the first test tube at a rate of 3,000 cc. per minute, the separation being effected at a temperature of 20°-25° C. About 99.7% of the chlorine present in the initial gas mixture was absorbed and about 99.7% of the chlorine dioxide present in the initial gas mixture was delivered from the last test tube.

This invention is useful in connection with the production of chlorites as described in applications of George P. Vincent, filed August 15, 1934, Serial Numbers 739,887, and 739,940.

I claim:

1. In the production of chlorine dioxide, the improvement which comprises selectively separating chlorine from a gas mixture including chlorine and chlorine dioxide by contacting the gas mixture with a reagent of the class consisting of the oxides, hydroxides and carbonates of magnesium, the alkali metals and the alkaline earth metals for a period of contact and in the presence of a proportion of water limited and correlated to minimize reaction between the reagent and chlorine dioxide.

2. In the production of chlorine dioxide, the improvement which comprises selectively separating chlorine from a gas mixture including chlorine and chlorine dioxide by contacting the gas mixture with a substantial excess of a reagent of the class consisting of the oxides, hydroxides and carbonates of magnesium, the alkali metals and the alkaline earth metals for a period of contact and in the presence of a proportion of water limited and correlated to minimize reaction between the reagent and chlorine dioxide.

3. In the production of chlorine dioxide, the improvement which comprises selectively separating chlorine from a gas mixture including chlorine and chlorine dioxide and an inert gaseous diluent by contacting the gas mixture with a reagent of the class consisting of the oxides, hydroxides and carbonates of magnesium, the alkali metals and the alkaline earth metals for a period of contact and in the presence of a proportion of water limited and correlated to minimize reaction between the reagent and chlorine dioxide.

JAMES FREDERICK WHITE.